(12) United States Patent
Dyba et al.

(10) Patent No.: US 8,787,561 B2
(45) Date of Patent: Jul. 22, 2014

(54) TECHNIQUES FOR IMPLEMENTING ADAPTATION CONTROL OF AN ECHO CANCELLER TO FACILITATE DETECTION OF IN-BAND SIGNALS

(75) Inventors: Roman A. Dyba, San Diego, CA (US); Wen Wu Su, Austin, TX (US); Hongyang Deng, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1121 days.

(21) Appl. No.: 12/768,366

(22) Filed: Apr. 27, 2010

(65) Prior Publication Data

US 2011/0261949 A1 Oct. 27, 2011

(51) Int. Cl.
*H04M 9/08* (2006.01)

(52) U.S. Cl.
USPC ............................... 379/406.08; 379/406.01

(58) Field of Classification Search
USPC ............. 379/406.01, 406.05, 406.08–406.09, 379/406.16; 455/570
See application file for complete search history.

(56) References Cited

U.S. PATENT DOCUMENTS

| 5,631,957 A | 5/1997 | Greiss et al. |
| 5,943,407 A | 8/1999 | Davis et al. |
| 6,199,036 B1 | 3/2001 | Ahmadi |
| 6,570,985 B1* | 5/2003 | Romesburg ............. 379/406.08 |
| 6,650,627 B1 | 11/2003 | Goldman |
| 6,738,358 B2 | 5/2004 | Bist et al. |
| 2002/0118821 A1 | 8/2002 | Beamish et al. |
| 2005/0117739 A1* | 6/2005 | Demirekler et al. ..... 379/406.08 |
| 2010/0191525 A1* | 7/2010 | Rabenko et al. .............. 704/211 |

\* cited by examiner

*Primary Examiner* — Rasha Al Aubaidi
(74) *Attorney, Agent, or Firm* — Yudell Isidore Ng Russell PLLC

(57) ABSTRACT

A technique for detecting in-band signaling tones in a communication system includes performing a first adaptation of an adaptive filter of an echo canceller in response to detection of a far-end harmonic signal. In this case, the adaptive filter provides an echo estimation signal. The technique also includes subtracting the echo estimation signal from a near-end signal that includes one or more in-band signaling tones to provide an error signal. The technique further includes detecting, using a tone detector, the one or more in-band signaling tones in the error signal.

17 Claims, 4 Drawing Sheets

TECHNIQUES FOR IMPLEMENTING ADAPTATION CONTROL OF AN ECHO CANCELLER TO FACILITATE DETECTION OF IN-BAND SIGNALS

BACKGROUND

1. Field

This disclosure relates generally to adaptation control of an echo canceller and, more specifically, to techniques for implementing adaptation control of an echo canceller to facilitate detection of in-band signals.

2. Related Art

Echo cancellation is used in communication systems to remove echo from a voice communication in order to improve voice quality. Echo cancellation involves first recognizing an originally transmitted signal that re-appears, with some delay and linear modification, in a transmitted or received signal. More particularly, a signal affected by the phenomenon of echo produced by the presence of a hybrid circuit and/or acoustical coupling between a mouth-piece and an ear-piece is the signal travelling from the near-end to the far-end. If the point of reference is the near-end part of the connection, then the signal affected corresponds to the transmitted signal. If the point of reference is the far-end part of the connection, then the signal affected corresponds to the received signal. Upon recognition, an echo can be removed by subtracting the echo from a transmitted or received signal. Echo cancellation can be implemented using a digital signal processor (DSP).

Two primary sources of echo in telephony are acoustic echo and hybrid echo. Acoustic echo arises when sound from a speaker of a telephone handset is picked up by a microphone of the telephone handset. For example, acoustic echo may occur in conjunction with hands-free car phone systems, a standard telephone in speakerphone or hands-free mode, conference telephones, installed room systems that use ceiling speakers and table-top microphones, video conferencing systems, etc. Direct acoustic path echo is attributable to sound from a speaker of a handset that enters a microphone of the handset substantially unaltered. When indirect acoustic path echo (reverberation) occurs, the echo can be difficult to effectively cancel (unlike echo associated with a direct acoustic path) as the original sound is altered by ambient space. The altered echo may be attributed to certain frequencies being absorbed by soft furnishings and reflection of different frequencies at varying strength.

Acoustic echo cancellers are usually designed to deal with changes and additions to an original signal caused by imperfections of a speaker, imperfections of a microphone, reverberant space, and physical coupling. In general, acoustic echo cancellation (AEC) algorithms approximate results of a next sample by comparing the difference between current and one or more previous samples. The information has then been used to predict how sound is altered by an acoustic space. In this case, the model of the acoustic space is continually updated. The changing nature of a sampled signal is mainly due to changes in the acoustic environment, as contrasted with changes in the characteristics of a loudspeaker, a microphone, or physical coupling. That is, changes in a sampled signal are usually attributable to objects moving in an acoustic environment and movement of a microphone within the environment. For example, when a door is closed or opened, a chair is pulled in closer to a table, or drapes are opened or closed a change in reverberation of sound in an acoustic space occurs. To address changes in acoustic space, an echo cancellation algorithm may employ non-linear processing (NLP), which allows an algorithm to make changes to an acoustic space model that are suggested (but not yet confirmed) by signal comparison.

Hybrid (electric) echo is generated in public switched telephone networks (PSTNs) or in packet networks as a result of the reflection of electrical energy by a hybrid circuit. Hybrid echo may also be generated in voice-over-packet network systems, if the systems contain network elements (such as access gateways) that are equipped with access loop interfaces. As is known, most telephone local loops are two-wire circuits, while transmission facilities are usually four-wire circuits. A hybrid circuit or hybrid (typically, a part of an electronic device called a subscriber line interface circuit (SLIC)) converts a signal between the two-wire and four-wire circuits. Unfortunately, when an impedance mismatch occurs, a hybrid produces a hybrid echo signal. An adaptive filter (included in a line echo canceller or a network echo canceller) learns about characteristics of the hybrid during an adaptation process. The output signal from the adaptive filter is inverted and combined with the hybrid echo signal. When the adaptation process is performed correctly, the result of combination of the hybrid echo signal and the inverted output signal of the adaptive filter produces a very small signal (called an error signal). Ideally, the error signal is small such that the error signal is not perceived audibly.

An adaptive filter is a filter that self-adjusts its transfer function according to an optimizing algorithm. Due to the complexity of most optimizing algorithms, adaptive filters are usually implemented as digital filters using DSPs, which modify their filter coefficients based on an input signal. As the power of DSPs has increased, adaptive filters have become more common and are now routinely used in various devices, e.g., echo cancellers, mobile phones and other communication devices, camcorders and digital cameras, and medical monitoring equipment.

A relatively long adaptive filter is required for some line connections and/or access system configurations in order to cancel echo adequately. In general, long adaptive filters have a relatively high computational cost and are slow to converge. However, when a pure delay estimator is employed in conjunction with an adaptive filter, a shorter adaptive filter can usually be employed to model an active portion of a network echo path impulse response. In practice, the adaptation process usually never produces an ideal characteristic of the hybrid and the error signal is often so large that other approaches for reducing the error signal are needed. As mentioned above, a typical method of reducing the energy of the error signal is based on NLP.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
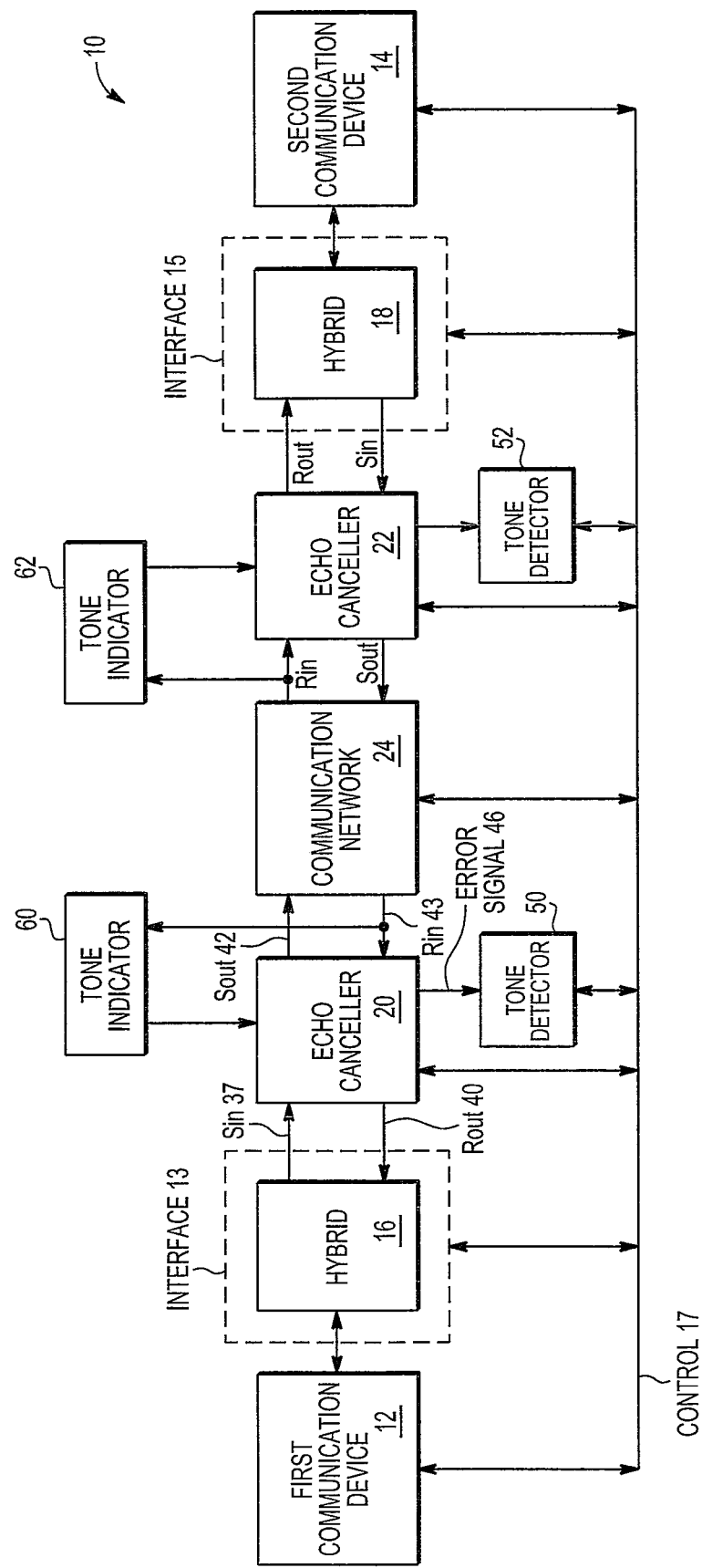
FIG. 1 is a diagram of a relevant portion of an example communication system (which carries voice communications and may carry data) that includes an echo canceller, configured according to an embodiment of the present invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with techniques for implementing adaptation control in an echo canceller to facilitate detection of in-band signals (e.g., a signal whose frequency is within a voice frequency band of a voice communication system), it will be appreciated that the present invention may find application in various devices (in a wired or wireless communication system) that benefit from implementing adaptation control to facilitate detecting in-band signaling tones.

As used herein, the term 'coupled' includes a direct electrical connection between elements or components and an indirect electrical connection between elements or components achieved using one or more intervening elements or components. As is also used herein, "Sin signal" refers to a send input (Sin) signal received from a near-end at a Sin port of an echo canceller, "Rout signal" refers to a receive output (Rout) signal provided to the near-end at an Rout port of the echo canceller, "Sout signal" refers to a send output (Sout) signal provided to a far-end at an Sout port of the echo canceller, "Rin signal" refers to a receive input (Rin) signal received from the far-end at an Rin port of an echo canceller and "Sgen signal" refers to a send generated (Sgen) signal generated by a communication device at the near-end.

Conventional solutions for providing transparency for in-band signaling are computationally expensive and do not provide transparency for "corner" cases (in which an in-band signal is at a relatively low energy as compared to an Rin signal). As one conventional example, an input of a tone detector may be coupled to an Sin port of an echo canceller so that the tone detector receives an undistorted signal. However, even when a tone detector is coupled to an Sin port of an echo canceller, unless the tone detector implements an adaptive filter in-band signals may not be detectable. As another conventional example, an input of a tone detector may be coupled to the Sout port of an echo canceller. However, when the input of the tone detector is coupled to the Sout port of the echo canceller, in-band signaling components may be severely distorted by nonlinear processing of the echo canceller. When in-band signaling is distorted, communication between the near-end and the far-end may be affected such that a call cannot be completed. While dual-tone multi-frequency (DTMF) temporal clipping may be addressed by equipping an echo canceller with functionality that permits passage of signaling tones to a tone detector, such an approach usually requires functional duplication in a tone detector which results in a more expensive solution.

In general, conventional echo cancellation solutions have been incapable of passing detectable signaling tones (e.g., DTMF signals) provided by a near-end user (Sin-to-Sout direction) in the presence of signaling tones (e.g., a dial-tone) received from a network (Rin-to-Rout direction). According to the present disclosure, adaptation of an adaptive filter (that is a part of line/network echo canceller) is controlled to facilitate passing (to a tone detector) detectable signaling tones provided by a near-end user in the presence of signaling tones received from a network. Typically, implementing adaptation control in the presence of signaling tones increases signal-to-noise ratio (SNR), due to the reduction of an echo signal, such that a DTMF tone detector is capable of detecting tones provided in an adaptive filter error signal.

As mentioned above, non-linear processing (NLP) in an echo canceller tends to distort (e.g., temporally clip and attenuate) in-band signaling that is transmitted from the near-end Sgen direction towards the Sin-to-Sout direction. At least one conventional solution to address NLP distortion has included equipping a tone detector with an adaptive filter. One conventional tone detector (that includes an adaptive filter) has been configured to be coupled across the Sin and Rout ports of an echo canceller. The conventional tone detector has been capable of detecting tones traveling in the egress direction (i.e., from Sgen-to-Sout) and removing echo (caused by the presence of the hybrid circuit) of signals traveling in the ingress direction (i.e., from Rin-to-Rout).

In general, adaptive filters employed within conventional echo cancellers have not been configured to adapt when harmonic input (e.g., a signaling tone) is received. That is, adaptation of an adaptive filter (implemented within a conventional echo canceller) has halted in response to a control signal received from a tone indication block (or tone detector) that indicates detection of a harmonic signal (e.g., a dial-tone) coming from the Rin direction. The rationale for halting adaptation is related to the inability of an adaptive filter to produce a replica of the echo path if the Rin signal is singular (i.e., the spectral content of the Rin signal is limited, as in the case of in-band signaling that includes a dial-tone). Unfortunately, halting adaptation prevents using an adaptive filter for echo removal during detection of in-band signaling tones and, as such, the echo of the in-band signaling waveform has not been reduced. Discontinuing echo removal during generation of DTMF signals (or any in-band signals) traveling from Sgen-to-Sout (i.e., in the egress direction) makes it difficult (if not impossible) for a tone detector to detect the DTMF signals (or any in-band signals) in the Sin-to-Sout direction.

According to one embodiment of the present disclosure, an echo canceller is integrated with a tone detector and tone indication. The tone indication is activated only after the initial stage of the connection, which corresponds to a disappearance of the dial-tone (in the Rin-to-Rout direction). In this case, the tone detector (instead of receiving the Sout signal, which is provided at an output of an NLP) receives an error signal that is not processed by the NLP of the echo canceller. Providing the error signal to the tone detector facilitates detecting in-band signaling tones that are not tainted with an echo signal or distorted (either temporarily and/or by finite attenuation) by the NLP of the echo canceller.

Sharing an adaptive filter (e.g., combined with a pure delay block, but with NLP excluded) between an echo canceller and a tone detector reduces duplicate functional blocks and, as such, generally provides a less expensive solution (from a computational viewpoint). The techniques disclosed herein may be advantageously employed to facilitate testing of DTMF transparency modes (e.g., a dial-tone presence test #16a and a composite source signal (CSS) test #16b specified in the March 2009 version of the ITU-T G.168).

In general, the disclosed techniques provide an architectural solution that combines echo cancellation (as per ITU-T G.168 requirements) and a tone detector that receives (as an input) an adaptive filter error signal (with an echo component substantially removed, e.g., at least reduced by one-half) that is not tainted by NLP of an echo canceller. For example, an echo canceller may be configured with an additional send output error (Sout_e) port, which provides in-band signaling that is not distorted by NLP of the echo canceller and is not substantially polluted by an echo signal. In this case, an input of a tone detector is configured to be coupled to the Sout_e port of the echo canceller. In general, the proposed solution is more reliable and computationally less expensive (due to absence of redundant functionality) and provides a higher quality input signal (with reduced distortion and temporal clipping) to the tone detector. A five-port echo canceller configuration allows for sharing adaptive filtering between an echo canceller and a tone detector through implementation of an exposed Sout_e signal. Alternatively, an echo canceller may integrate a tone detector (as well as a tone indicator) to support in-band signaling and voice applications in a manner in which NLP of an echo canceller does not interfere with in-band signaling.

In various disclosed embodiments, an echo canceller is configured to adapt to voice signals and in-band signaling. In general, ITU-T G.168 compliant echo cancellers adequately handle a scenario that involves an Rin signal initially including a non-harmonic signal (e.g., voice) which changes to a harmonic signal (e.g., a dial-tone). It should be appreciated, however, that certain modifications may be desirable when an echo canceller adapts to a harmonic signal at the beginning of a call in order to mitigate future re-convergence when the Rin signal becomes non-harmonic. As used herein, convergence may be defined as the time required by an echo canceller to produce an estimate of an echo signal and remove the echo signal from an Sin signal below a threshold. For example, an echo signal may be considered to be substantially removed from the Sin signal when a magnitude of the echo signal is reduced by one-half. In general, changing finite impulse response (FIR) time-based filter coefficients from harmonic coefficients to non-harmonic coefficients better reflects the echo path impulse response characteristic and improves re-convergence speed. An echo canceller that provides integrated tone detection may address re-convergence (i.e., the transition from a harmonic signal to a non-harmonic signal) in a number of ways. Typically, re-adaptation (starting with non-zero initial condition), with Rin being a voice signal, is equally fast as adaptation using zero conditions. As such, when an initial adaptation leads to non-invertible autocorrelation of the harmonic inputs and re-convergence needs to occur, the disclosed techniques do not generally increase computational complexity.

Sharing an adaptive filter between an echo canceller and a tone detector is feasible even when the echo canceller is configured to halt adaptation upon the detection of harmonic signals. In this case, however, the echo signal may not be adequately removed and the tone detector may not detect the DTMF digits. While implementing adaptation of an adaptive filter in the presence of harmonic signals requires re-adaptation for voice signals, the speed of re-adaptation is not compromised (as compared to a typical adaptation to voice signals). As noted above, when a pure delay estimator is employed in conjunction with an adaptive filter, a shorter adaptive filter can usually be employed to model an active portion of a network echo path impulse response. Today, a typical network echo canceller that is compliant with the ITU-T G.168 digital echo canceller standard may employ a twenty-four (24) millisecond adaptive filter. Per the ITU-T G.168 digital echo canceller standard, filter coefficients with relatively large values occupy significantly less than twenty-four milliseconds. In general, filter coefficients with small values, while being relatively important to final convergence, contribute little to initial convergence. The techniques disclosed herein generally do not increase the million clock cycles per second (MCPS) consumption of an adaptive filter implemented within a processor circuit, such as a digital signal processor (DSP).

According to one aspect of the present disclosure, a technique for detecting in-band signaling tones in a communication system includes performing a first adaptation of an adaptive filter of an echo canceller in response to detection of a far-end harmonic signal. In this case, the adaptive filter provides an echo estimation signal. The technique also includes subtracting the echo estimation signal from a near-end signal that includes one or more in-band signaling tones to provide an error signal. The technique further includes detecting, using a tone detector, the one or more in-band signaling tones in the error signal.

According to another aspect of the present disclosure, a communication device includes a control circuit (module), an adaptive filter in communication with the control circuit, an adder in communication with the control circuit, and a tone detector in communication with the control circuit. The adaptive filter is configured to perform a first adaptation in response to detection of a far-end harmonic signal and provide an echo estimation signal. The adder is configured to subtract the echo estimation signal from a near-end signal that includes one or more in-band signaling tones to provide an error signal. The tone detector is configured to detect the one or more in-band signaling tones in the error signal.

According to another aspect of the present disclosure, an echo canceller includes a digital signal processor (DSP) that is configured to implement an adaptive filter that is configured to perform a first adaptation in response to detection of a far-end harmonic signal. In this case, the adaptive filter provides an echo estimation signal. The DSP is also configured to subtract the echo estimation signal from a near-end signal that includes one or more in-band signaling tones to provide an error signal. The DSP is further configured to provide the error signal to a tone detector (that is configured to detect the one or more in-band signaling tones in the error signal) and perform a second adaptation in response to detection of a far-end non-harmonic signal.

With reference to FIG. 1, an example communication system 10 is illustrated that includes one or more echo cancellers that are configured according to the present disclosure. The system 10 includes a first communication device (including a transmitter/receiver) 12, an interface 13 (which includes hybrid circuit (hybrid) 16), an echo canceller 20, a tone detector 50, a tone indicator 60, a communication network 24, an echo canceller 22, a tone detector 52, a tone indicator 62, an interface 15 (which includes hybrid 18), and a second communication device (including a transmitter/receiver) 14. The device 12 is coupled to the hybrid 16, which is coupled to the echo canceller 20. The hybrid 16 provides a send input (Sin) signal 37 to the echo canceller 20 (on an Sin port) and receives a receive output (Rout) signal 40 from the echo canceller 20 (on an Rout port). The echo canceller 20 is coupled to the network 24 and provides an echo canceller send output (Sout) signal 42 to the network 24 (on an Sout port) and receives a receive input (Rin) signal 43 from the network 24 (on an Rin port). An output of the echo canceller 20 is also coupled to an input of the tone detector 50 and provides an error signal 46 to the input of the tone detector 50. An input of the echo canceller 20 is coupled to an output of the tone indicator 60 and an input of the tone indicator 60 is coupled to the Rin port of the echo canceller 20.

Similarly, the device 14 is coupled to the hybrid 18, which is coupled to the echo canceller 22, which is coupled to the network 24. The echo canceller 22 also provides an echo cancelled Sout signal to the network 24 and receives an Rin signal from the network 24. The echo canceller 22 also provides an error signal to the tone detector 52. An input of the echo canceller 22 is coupled to an output of the tone indicator 62 and an input of the tone indicator 62 is coupled to the Rin port of the echo canceller 22. A control bus (control) 17 is configured to communicate one or more control signals that are provided to each component of the system 10 or a subset of the components of the system 10. In operation, the device 12 provides communication signals to and receives communication signals from the hybrid 16. The devices 12 and 14 can be virtually any device (e.g., a telephone or a modem) used for communicating over the network 24. The device 14 and the hybrid 18 function in a similar manner as the device 12 and the hybrid 16, respectively, and for brevity are not discussed in detail herein.

In communications between the device 12 and the device 14, hybrid echo may be introduced by the hybrids 16 and 18. As previously noted, the source of the echo is the impedance mismatch between the hybrids 16 and 18 and the network 24. For example, if the impedance within the hybrid 16 perfectly matched the impedance of the network 24, all of the energy from the Rout signal 40 would be transmitted to the device 12. However, when an impedance mismatch exists, some of the energy from the Rout signal 40 is reflected back through the Sin signal 37. If the round trip delay through the network 24 is sufficiently long, the reflected echo received by a transmitter/receiver will be noticeable during the communication. The round trip delay may result in noticeable echoes or even unbearable disturbance during a telephone voice communication.

For example, a sufficiently long delay may correspond to a round trip delay of greater than forty (40) milliseconds. If, on the other hand, the round trip delay is significantly smaller, the echo may not be disruptive since it may be indistinguishable from a side tone. The round trip delay may include a variety and/or combination of different delays, e.g., a transmission delay, a processing delay, and/or a computation delay. Depending on the communication system, the round trip delay may be sufficiently large to disrupt communication. In various embodiments, the echo cancellers 20 and 22 are implemented to reduce echo in the system 10 to a manageable level. For example, the echo introduced by the hybrid 16 from a signal received via the Rout signal 40 (from the device 14) and reflected back (to the device 14) via the Sin signal 37 is processed by the echo canceller 20 to reduce the reflected echo prior to sending the Sout signal 42 (through the network 24) to the device 14.

The tone detector 50 is configured to receive an error signal 46 (from the echo canceller 20) and perform tone detection (on the error signal 46) to determine if a tone (e.g., a dual-tone multiple frequency (DTMF) signal) is present within the Sin signal 37. The error signal 46 (as is described in further detail in conjunction with FIG. 2) is an intermediate signal within the echo canceller 20. It should be noted that the error signal 46 is not the same as the Sout signal 42, which corresponds to the echo cancelled output of the echo canceller 20. For example, the Sin signal 37 may be a composite signal that includes both voice and tone components (also referred to as voice information and tone information, respectively). The tone components may correspond to a single frequency tone and/or multiple frequency tones and are usually referred to as in-band signaling tones. When the tone components (which are in-band with the voice components) are relatively weak, the processing performed by non-linear processing (NLP) of the echo canceller 20 may distort the Sout signal 42, such that tone components cannot be easily detected in the Sout signal 42. According to an aspect of the present disclosure, the error signal 46 (which is not processed by the NLP of the echo canceller 20) is employed for tone detection. It should be appreciated that the tone detector 50 may correspond to a wide variety of conventional tone detectors.

The network 24 may correspond to a wide variety of wired networks (e.g., a public switched telephone network (PSTN)) or wireless networks that implement a wide variety of different protocols, e.g., voice over internet protocol (VoIP), data over packet, or asynchronous transfer mode (ATM). In a typical implementation, the control 17 provides a control pathway for components (e.g., the device 12 and the device 14, the hybrids 16 and 18, the echo cancellers 20 and 22, and the network 24) of the system 10. In general, control signals transmitted via the control 17 do not correspond to in-band signals. For example, the control 17 may include a signal to enable or disable the echo cancellers 20 and 22. As another example, the control 17 may also include a signal to indicate whether a telephone is on-hook or off-hook. The tone detectors 50 and 52 may also send messaging signals (via the control 17) to indicate, for example, that one or more tones have been detected and their corresponding frequency. In the discussion herein, the device 12 is referred to as the near-end with respect to echo canceller 20 and the device 14 is referred to as the far-end with respect to the echo canceller 20. It should appreciated that echo canceller 22 operates analogously to the echo canceller 20.

Figure 2:
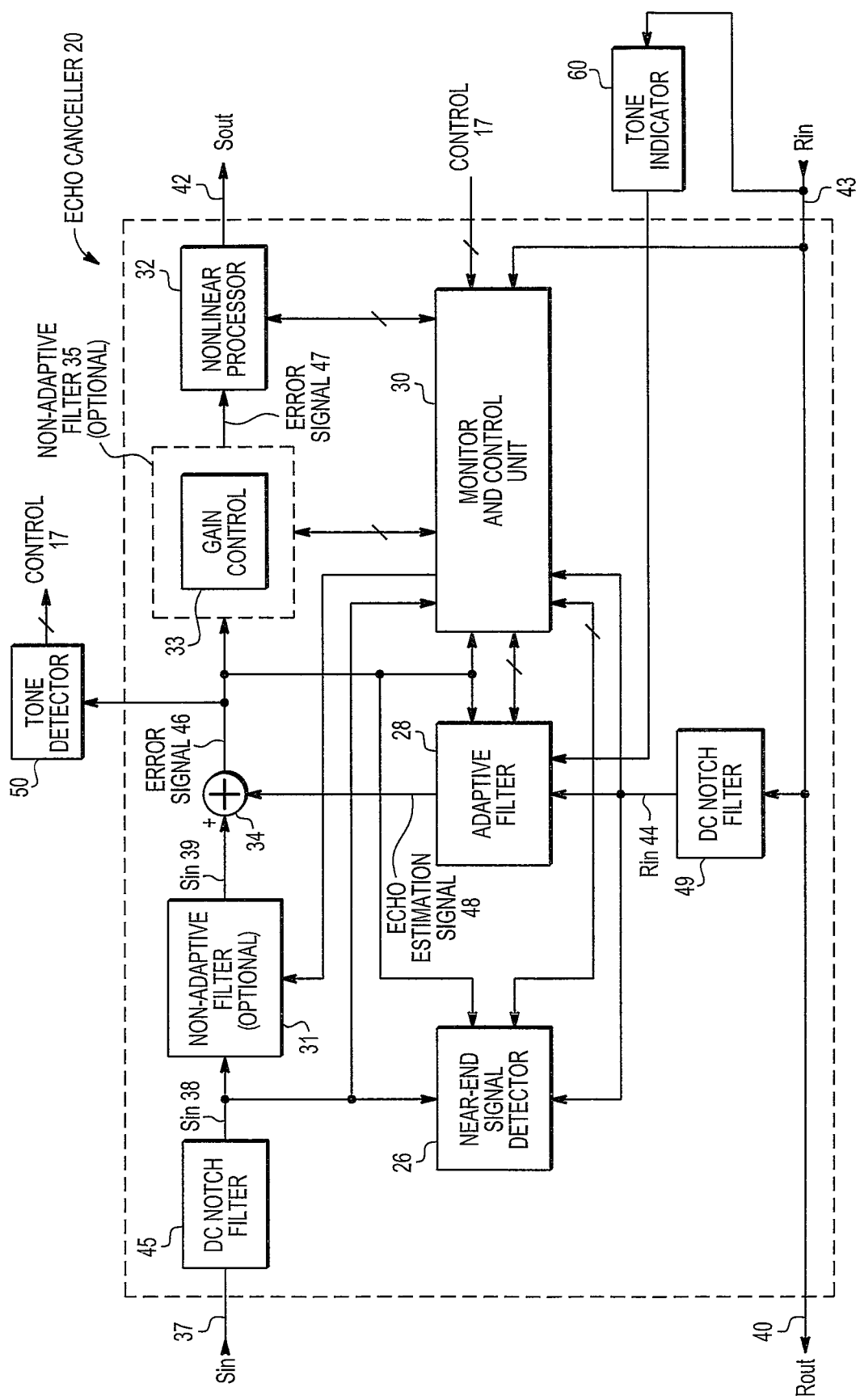
FIG. 2 is a diagram of a relevant portion of an example echo canceller, configured according to an embodiment of the present invention.

With reference to FIG. 2, the echo canceller 20 of FIG. 1 is further illustrated in conjunction with the tone detector 50 and the tone indicator 60 of FIG. 1. As is illustrated, the echo canceller 20 includes a direct current (DC) notch filter 45, an optional non-adaptive filter 31, an adder 34, an optional non-adaptive filter 35 (which includes a gain control 33), non-linear processor 32, a near-end signal detector 26, an adaptive filter 28, a monitor and control unit (control unit) 30, and a DC notch filter 49. It should be appreciated that an echo canceller configured according to the present disclosure may include additional (e.g., a pure delay estimator) or fewer components. The DC notch filter 45 receives the Sin signal 37 and outputs Sin signal 38 to an input of the near-end signal detector 26 and an input of the control unit (control circuit) 30. The Sin signal 38 is also provided to an input of the non-adaptive filter 31, which is coupled to and receives control signals from the control unit 30. An output of the non-adaptive filter 31 provides Sin signal 39 to a first input of the adder (combiner) 34. In the event that the non-adaptive filter 31 is omitted, the Sin signal 38 is equivalent to the Sin signal 39.

A second input of the adder 34 receives an echo estimation signal 48 (from the adaptive filter 28) and an output of the adder 34 provides the error signal 46 to an input of the gain control 33, an input of the tone detector 50, an input of the near-end signal detector 26, and an input of the control unit 30. An input/output port of the gain control 33 is coupled to an input/output port of the control unit 30 and an output of the gain control 33 provides an error signal 47 to an input of the non-linear processor 32. In the case where the non-adaptive filter 35 is implemented in the echo canceller 20, the gain control 33 is implemented within the non-adaptive filter 35 (which receives the error signal 46, is bi-directionally coupled to the control unit 30, and provides the error signal 47). The non-linear processor 32 is coupled to a port of the control unit 30 and an output of the non-linear processor 32 provides the Sout signal 42. The control unit 30 is also coupled to the control 17, receives the Rin signal 43, receives an Rin signal 44 from the DC notch filter 49, and is coupled to the adaptive filter 28 and the near-end signal detector 26. The DC notch filter 49 receives the Rin signal 43 (which, in the illustrated embodiment, is the same as Rout signal 40) and provides the Rin signal 44 to the near-end signal detector 26, the adaptive filter 28, and the control unit 30.

In a typical communication, the Sin signal 37 may include voice information, tone information, and reflected echo from the Rin signal 43. It should be appreciated that, in the disclosed embodiment, the error signal 46 is not sent to the network 24.

As discussed above, the Sin signal 37 may include reflected echo introduced by the impedance mismatch attributable to the hybrid 16. The echo canceller 20 is configured to reduce (or eliminate) the introduced reflected echo and provide the Sout signal 42. When the impedance in the hybrid 16 is perfectly matched, a signal received at the input of the hybrid 16 (i.e., the Rout signal 40) results in virtually no response from the hybrid 16 (in the Sin signal 37) as there is no reflected echo. However, when the hybrid is in an imbalanced state (where the impedance is mismatched), the Rout signal 40 causes a hybrid impulse response (h). In general, the adaptive filter 28 attempts to imitate the hybrid circuit by producing a replica of the echo signal, which is subtracted from the Sin signal 39 (via the adder 34) to produce the error signal 46. The echo signal (which is equal to the Sin signal 37 when the device 12 does not produce any signal, i.e., when the near-end Sgen signal is zero, or absent) corresponds to a linearly distorted Rout signal.

The linear distortions include pure transposition in time, i.e., a shift in time by a parameter called pure delay, and include other linear distortions that are related to hybrid dispersion properties. The pure delay refers to the portion of the impulse response from the beginning to where some significant values start to occur. The dispersion time refers to the portion of the impulse response duration from where the significant responses begins to where the responses virtually disappear. The shape of the impulse response (as per the portion corresponding to the dispersion time segment) can be translated into the frequency characteristic of the hybrid (as seen from the Rout signal 40 and the Sin signal 37 ports).

The DC notch filter 45 removes the DC component from the Sin signal 37. Similarly, the DC notch filter 49 removes the DC component from the Rout signal 40. In an alternate embodiment, a high-pass filter may be used in place of one or both of the filters 45 and 49. In general, DC notch filters (which are usually first-order filters) are computationally cheaper than high-pass filters (which are usually second-order or higher filters) and produce no rippling effect which helps maintain a flat gain through a passband of the filter. In an alternate embodiment, a single shared DC notch filter may be used to perform the functions of the filters 45 and 49.

As noted above, the non-adaptive filters 31 and 35 are optional. For the following discussion, an assumption is made that the Sin signal 38 and the Sin signal 39 are equal and the error signal 47 is a gain adjusted version of the error signal 46, without the effects of the non-adaptive filters 31 and 35. In this case, the Sin signal 39 is the send signal which includes any near-end Sgen signal that is transmitted by the transmitter of the device 12 and any reflected echo introduced from the Rout signal 40 (or the Rin signal 43) by the hybrid 16. As such, the Sin signal 39 can be expressed as "Sgen+echo". It should be appreciated that the near-end Sgen signal may include a voice component (e.g., when a near-end talker is present) and/or one or more tone components. If both a voice component and one or more tone components are present, then the Sin signal 39 may be considered a voice/tone composite signal. In operation, the adaptive filter 28 provides an estimation of the reflected echo (corresponds to the echo estimation signal 48) to the adder 34, which outputs the error signal 46.

The error signal 46 can be expressed as 'Sin signal 39−echo estimation signal (estimated echo) 48' or, substituting the above expression for Sin 39, as 'Sgen+echo−estimated echo'. When the estimated echo is accurate (i.e., equal or substantially equal to the actual echo), then the error signal 46 only includes Sgen without any substantial echo. However, if the estimated echo is not accurate, the error signal 46 includes both Sgen and a residual echo component. In this case, the error signal 46 can be expressed as 'Sgen+residual echo' where the residual echo is 'echo−estimated echo'. When Sgen is absent (i.e., when the near-end is silent, meaning no signal is being transmitted from the transmitter of the device 12), the error signal 46 represents only the residual echo. In this case, the error signal 46 may be used to perform an adaptive process to minimize the residual echo. However, if an Sgen signal is present, the error signal 46 cannot be used to perform the adaptive process because the adaptive filter 28 uses the error to adapt, and with the presence of Sgen, the error signal 46 is no longer just the error. As such, in a typical case, the detection of an Sgen signal is used to determine whether the adaptive process may be performed. The near-end signal detector 26 uses the error signal 46 and control signals from the control unit 30 to detect the presence of Sgen (i.e., to detect the presence of a near-end talker).

In the adaptive filter 28, the echo estimation signal 48, y(k), is calculated by $y(k)=X^T(k) \cdot H(k)$, where $X(k)=[x(k), x(k-1), \ldots, x(k-N+1)]^T$ is the input signal vector extending over the duration of the finite impulse response (FIR) filter span, x(n) corresponds to the Rin signal 44, H(k) is a filter coefficient vector for the kth iteration where $H(k)=[h_0(k), h_1(k), \ldots, h_{N-1}(k)]^T$. The actual update of the filter coefficients is governed by an implemented algorithm. The implemented algorithm may be virtually any application appropriate adaptive filtering algorithm (e.g., an affine projection (AP) algorithm, a normalized least mean squares (NLMS) algorithm, a least mean squares (LMS) algorithm, or a recursive least squares (RLS) algorithm).

Any residual echo in the error signal 46 may be further reduced by the non-linear processor 32. The non-linear processor 32 receives the error signal 47 (which corresponds to a gain adjusted version of the error signal 46) and control signals from the control unit 30 to produce Sout 42, which, ideally, includes no echo and is provided as an output of the echo canceller 20 to the network 24. Unfortunately, the NLP performed by non-linear processor 32 introduces distortion into the Sout signal 42. As such, when the Sout signal 42 is a voice/tone composite signal including both voice and tone components, the distortion by non-linear processor 32 may make the tone components difficult to detect. According to an aspect of the present disclosure, the error signal 46 is provided to the tone detector 50 to facilitate improved detection of tone components. In this manner, the tone detector 50 can operate on a less distorted signal (i.e., the error signal 46 instead of the Sout signal 42).

The control unit 30 may implement a filter coefficient monitor which is used to determine whether a true hybrid exists such that adaptive filter 28 does not attempt to adapt to invalid hybrids. The control unit 30 may also include a gain monitor to control the gain control 33 (within the adaptive filter 35) and facilitate maintaining stability of the system 10. The control unit 30 may also include a tone indicator and a tone detector for use in controlling the adaptive filter 35. The tone indicator and tone detector may be used to detect signaling tones within the system 10. For example, the signaling tones may include a 2100 Hz tone with a phase reversal for disabling the echo canceller when data is to be sent following the signaling tone. As mentioned above, disabling the echo canceller 20 prevents the adaptive filter 28 from diverging and causing instability in the system 10. When implemented, the non-adaptive filter 31 can be used to reduce the length of the adaptive filter 28 and the non-adaptive filter 35 compensates for the effects of the non-adaptive filter 31, such that the near-end signal Sgen is not distorted.

In the case of composite signals having both voice and tone components, the non-linear processor tends to introduce distortions, such as temporal clipping and/or attenuation. In at least one embodiment, an echo canceller allows for integrated tone detector capabilities by using an intermediate signal (i.e., the error signal 46) within the echo canceller 20 for tone detection rather than the Sout signal 42 of the echo canceller 20. In this embodiment, the adaptive filter 28 is shared between the echo canceller 20 and the tone detector 50.

Figure 3:
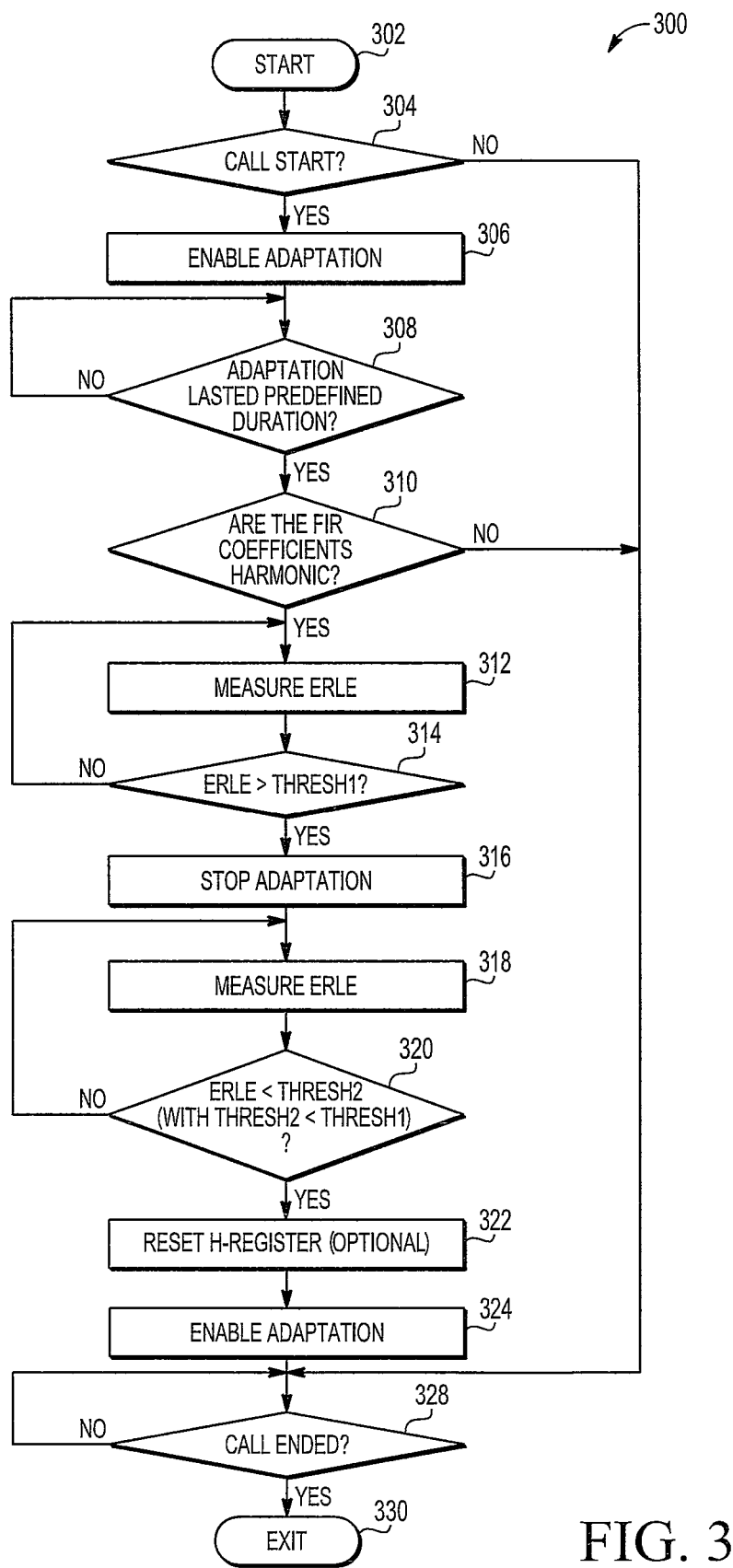
FIG. 3 is a flowchart of an example process for implementing adaptation control in an echo canceller, according to various embodiments of the present invention.

Moving to FIG. 3, an example process 300 for implementing adaptation control in an echo canceller to facilitate detection of in-band signals in a communication system, according to one or more embodiments of the present disclosure, is illustrated. The process 300 (which is particularly useful when an initial harmonic Rin signal changes to a non-harmonic Rin signal) is initiated in block 302 at which point control transfers to decision block 304, where the process 300 determines if a communication is a call start. If a call start is not indicated (e.g., by a level of a receive input, Lrin) in block 304, control transfers to decision block 328, where the process 300 determines if an in-process call has ended. If a call start is indicated in block 304, control transfers to block 306 where adaptation of filter coefficients of an adaptive filter (e.g., an adaptive filter shared between an echo canceller and a tone detector) is enabled. As noted above, performing adaptation for the adaptive filter facilitates reduction of echo from an Sin signal.

Next, in decision block 308, the process 300 determines if adaptation has lasted a predefined duration. Control loops on block 308, while adaptation is not complete. When adaptation is complete in block 308, control transfers to decision block 310 where the process 300 determines whether FIR time-domain filter coefficients of the adaptive filter are harmonic. When the coefficients are not harmonic (which indicates, for example, that a dial-tone is not present), control transfers to decision block 328. When the coefficients are harmonic (indicating, for example, the presence of a dial-tone), control transfers to decision block 312 where the echo return loss enhancement (ERLE) is measured. Next, in decision block 314, the process 300 determines whether the ERLE is greater than a first threshold (THRESH1). If the measured ERLE is not greater than the first threshold in block 314, control loops back to block 312 (while adaptation continues). If the measured ERLE is greater than the first threshold (indicating a desired ERLE) in block 314, control transfers to block 316 where adaptation is stopped.

Next, in block 318 the ERLE is measured. Then, in decision block 320, the process 300 determines whether the measured ERLE from block 318 is less than a second threshold (THRESH2), which is less than the first threshold. When the ERLE is not less than the second threshold, control loops back to block 318. When the ERLE is less than the second threshold, control transfers to block 322 as the Rin signal has become non-harmonic (indicating, for example, voice input). In block 322, an H-register (i.e., a register that stores a digital representation of an echo path impulse response in the form of FIR time-domain filter coefficients of the adaptive filter) may be optionally reset. In general, changing the finite impulse response (FIR) time-based filter coefficients from harmonic coefficients to non-harmonic coefficients better reflects the echo path impulse response characteristic and improves re-convergence speed. Next, in block 324, adaptation is enabled such that the coefficients may be determined for the voice input. Then, in decision block 328, the process 300 determines whether the call has ended. While the call has not ended, control loops on block 328. When the call has ended in block 328, control transfers to block 330, where control returns to a calling process. Advantageously, the disclosed techniques do not generally increase computational complexity when an initial adaptation leads to non-invertible autocorrelation of the harmonic inputs and re-convergence needs to occur.

Figure 4:
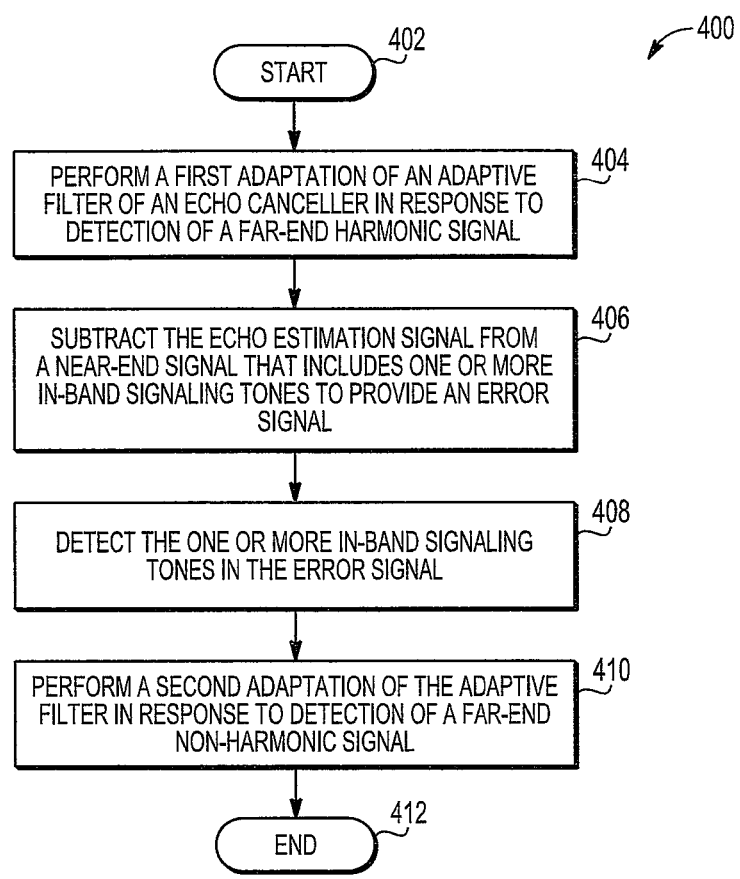
FIG. 4 is a flowchart of an example process for implementing adaptation control in an echo canceller to facilitate detection of in-band signals in a communication system, according to various embodiments of the present invention.

Turning to FIG. 4, an example process 400 for implementing adaptation control in an echo canceller to facilitate detection of in-band signals in a communication system, according to one or more embodiments of the present disclosure, is illustrated. The process 400 is initiated in block 402, at which point control transfers to block 404. In block 404 the process 400 performs a first adaptation of an adaptive filter of an echo canceller in response to detection of a far-end harmonic signal (e.g., a dial-tone). In this case, the adaptive filter provides an echo estimation signal. Next, in block 406, the process 400 subtracts the echo estimation signal from a near-end signal that includes one or more in-band signaling tones to provide an error signal. Then, in block 408, the process 400 detects, using a tone detector, the one or more in-band signaling tones (e.g., DTMF digits) in the error signal. Next, in block 410, the process 400 performs a second adaptation of the adaptive filter in response to detection of a far-end non-harmonic signal (e.g., a voice signal). Following block 410, control transfers to block 412, where the process 400 ends and control returns to a calling process. Advantageously, the disclosed techniques do not generally increase computational complexity when re-convergence of an adaptive filter needs to occur while at the same time facilitating improved detection of DTMF digits in the presence of an Rin signal that takes the form of a dial-tone.

As may be used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in various embodiments of the present invention may be implemented using any combination of software, firmware or hardware. As a preparatory step to practicing the invention in software, code (whether software or firmware) according to a preferred embodiment will typically be stored in one or more machine readable storage mediums such as semiconductor memories such as read-only memories (ROMs), programmable ROMs (PROMs), etc., thereby making an article of manufacture in accordance with the invention. The article of manufacture containing the code is used by either executing the code directly from the storage device or by copying the code from the storage device into another storage device such as a random access memory (RAM), etc. An apparatus for practicing the techniques of the present disclosure could be one or more communication devices.

Although the invention is described herein with reference to specific embodiments, various modifications and changes can be made without departing from the scope of the present invention as set forth in the claims below. For example, the techniques disclosed herein are generally broadly applicable to wired and wireless communication systems that facilitate voice communication, in addition to data communication. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method of detecting in-band signaling tones in a communication system, comprising:
   performing a first adaptation of an adaptive filter of an echo canceller in response to detection of a far-end harmonic signal, wherein the adaptive filter provides an echo estimation signal;
   subtracting the echo estimation signal from a near-end signal that includes one or more in-band signaling tones to provide an error signal;
   detecting, using a tone detector, the one or more in-band signaling tones in the error signal; and
   performing a second adaptation of the adaptive filter in response to detection of a far-end non-harmonic signal.

2. The method of claim 1, wherein the one or more in-band signaling tones include one or more dual-tone multi-frequency (DTMF) signals.

3. The method of claim 1, wherein the harmonic signal is a ring tone and the non-harmonic signal is voice.

4. The method of claim 1, wherein the error signal does not include a substantial echo signal component and the tone detector shares the adaptive filter of the echo canceller.

5. The method of claim 1, wherein the error signal is not distorted by non-linear processing of the echo canceller and the tone detector does not include a separate adaptive filter.

6. The method of claim 1, wherein the adaptive filter implements an affine projection (AP) algorithm, a normalized least mean squares (NLMS) algorithm, a least mean squares (LMS) algorithm, or a recursive least squares (RLS) algorithm.

7. A communication device, comprising:
   a control circuit;
   an adaptive filter in communication with the control circuit, wherein the adaptive filter is configured to perform a first adaptation in response to detection of a far-end harmonic signal, and wherein the adaptive filter provides an echo estimation signal and the adaptive filter is further configured to perform a second adaptation in response to detection of a far-end non-harmonic signal;
   an adder in communication with the control circuit, wherein the adder is configured to subtract the echo estimation signal from a near-end signal that includes one or more in-band signaling tones to provide an error signal; and
   a tone detector in communication with the control circuit, wherein the tone detector is configured to detect the one or more in-band signaling tones in the error signal, and wherein the first adaptation modifies filter coefficients of the adaptive filter and the filter coefficients are finite impulse response (FIR) time-domain filter coefficients.

8. The communication device of claim 7, wherein the one or more in-band signaling tones include one or more dual-tone multi-frequency (DTMF) signals.

9. The communication device of claim 7, wherein the harmonic signal is a ring tone and the non-harmonic signal is voice.

10. The communication device of claim 7, wherein the error signal does not include a substantial echo signal component and the tone detector shares the adaptive filter of the echo canceller.

11. The communication device of claim 7, wherein the error signal is not distorted by non-linear processing of the echo canceller and the tone detector does not include a separate adaptive filter.

12. The communication device of claim 8, wherein the adaptive filter implements an affine projection (AP) algorithm, a normalized least mean squares (NLMS) algorithm, a least mean squares (LMS) algorithm, or a recursive least squares (RLS) algorithm.

13. An echo canceller, comprising:
   a processor circuit configured to:
      implement an adaptive filter that is configured to perform a first adaptation in response to detection of a far-end harmonic signal, wherein the adaptive filter provides an echo estimation signal;
      subtract the echo estimation signal from a near-end signal that includes one or more in-band signaling tones to provide an error signal;
      provide the error signal to a tone detector that is configured to detect the one or more in-band signaling tones in the error signal; and
      perform a second adaptation in response to detection of a far-end non-harmonic signal.

14. The echo canceller of claim 13, wherein the first adaptation modifies filter coefficients of the adaptive filter to first values and the second adaptation modifies the filter coefficients to second values, and wherein at least some of the first and second values are different and the filter coefficients are finite impulse response (FIR) time-domain filter coefficients.

15. The echo canceller of claim 13, wherein the one or more in-band signaling tones include one or more dual-tone multi-frequency (DTMF) signals and the harmonic signal is a ring tone.

16. The echo canceller of claim 13, wherein the error signal does not include a substantial echo signal component and is not distorted by non-linear processing of the echo canceller, and wherein the tone detector does not include a separate adaptive filter.

17. The echo canceller of claim 13, wherein the adaptive filter implements an affine projection (AP) algorithm, a normalized least mean squares (NLMS) algorithm, a least mean squares (LMS) algorithm, or a recursive least squares (RLS) algorithm.

* * * * *